US008561715B2

(12) United States Patent
Gut et al.

(10) Patent No.: US 8,561,715 B2
(45) Date of Patent: Oct. 22, 2013

(54) CONTROL METHOD FOR A HAND-OPERATED POWER TOOL

(75) Inventors: Manuel Gut, Feldkirch (AT); Hoop Alexander, Schaan (LI); Michael Wierer, Bludenz (AT); Dieter Profunser, Feldkirch (AT); Boeni Hans, Werdenberg (CH); Christof Freischlaeger, Feldkirch (AT)

(73) Assignee: Hilti Aktiengesellschaft, Schaan (LI)

( * ) Notice: Subject to any disclaimer, the term of this patent is extended or adjusted under 35 U.S.C. 154(b) by 265 days.

(21) Appl. No.: 12/968,919

(22) Filed: Dec. 15, 2010

(65) Prior Publication Data

US 2011/0162860 A1 Jul. 7, 2011

(30) Foreign Application Priority Data

Dec. 16, 2009 (DE) ........................ 10 2009 054 762

(51) Int. Cl.
*B23Q 11/04* (2006.01)

(52) U.S. Cl.
USPC .................. 173/1; 173/11; 173/176; 173/181

(58) Field of Classification Search
USPC ........................................ 173/1, 11, 176, 181
See application file for complete search history.

(56) References Cited

U.S. PATENT DOCUMENTS

| | | | | | |
|---|---|---|---|---|---|
| 3,892,146 | A * | 7/1975 | Yasoshima | 81/469 |
| 3,939,920 | A * | 2/1976 | Hardiman et al. | 173/1 |
| 4,267,914 | A * | 5/1981 | Saar | 192/147 |
| 5,014,794 | A * | 5/1991 | Hansson | 173/181 |
| 5,181,575 | A * | 1/1993 | Maruyama et al. | 173/180 |
| 5,277,261 | A * | 1/1994 | Sakoh | 173/176 |
| 5,484,026 | A * | 1/1996 | Susaki et al. | 173/4 |
| 5,563,482 | A * | 10/1996 | Shaw et al. | 318/272 |
| 5,584,619 | A | 12/1996 | Guzzella | |
| 5,831,402 | A * | 11/1998 | Yang | 318/281 |
| 6,680,595 | B2 * | 1/2004 | Ito | 318/434 |
| 2004/0182588 | A1 * | 9/2004 | Tokunaga et al. | 173/2 |
| 2008/0170340 | A1 | 7/2008 | Roehm et al. | |
| 2008/0289839 | A1 * | 11/2008 | Hricko et al. | 173/1 |

FOREIGN PATENT DOCUMENTS

| | | | |
|---|---|---|---|
| DE | 30 38 682 | A1 | 4/1982 |
| DE | 36 10 682 | A1 | 10/1987 |
| DE | 196 28 945 | A1 | 5/1997 |
| DE | 10 2005 038 225 | A1 | 2/2007 |

OTHER PUBLICATIONS

German Search Report, dated Oct. 7, 2010, 3 pages.

* cited by examiner

*Primary Examiner* — Brian D Nash

(74) *Attorney, Agent, or Firm* — Crowell & Moring LLP

(57) ABSTRACT

A hand-operated rotary power tool and a method of operating the tool is disclosed. The tool has an electric motor for driving a rotary tool, a sensor device for detecting a blockade of the tool and a triggering device, which, in response to a blockade detected by the sensor device, reverses a direction of rotation of the electric motor prior to the blockade for a predetermined duration and immediately following induces the electric motor to again rotate in the direction of rotation.

11 Claims, 1 Drawing Sheet

CONTROL METHOD FOR A HAND-OPERATED POWER TOOL

This application claims the priority of German Patent Document No. 10 2009 054 762.2, filed Dec. 16, 2009, the disclosure of which is expressly incorporated by reference herein.

BACKGROUND AND SUMMARY OF THE INVENTION

The present invention relates to a control method for a hand-operated power tool and a power tool.

A protective mechanism for a drill is known from U.S. Pat. No. 5,584,619, which is supposed to protect the user from excessive stress when a drill bit is blocked. As soon as a blockade is detected or anticipated, the drill deactivates. Cases may occur where the drill bit gets jammed on a sustained basis.

In accordance with the principles of the present invention, a control method protects the user and works against sustained jamming of a drill bit.

In the case of the inventive control method for a hand-operated power tool, a driving electric motor rotates in a direction of rotation opposite from the direction of rotation prior to a blockade for a duration when a blockade is detected. Immediately following the duration, the electric motor again rotates in the direction of rotation prior to the blockade.

The control method has surprisingly proven to be qualitatively different from a short-term interruption of the power train by a slip clutch in the case of a blockade and periodic interruption in the case of a blockade on a sustained basis. In this case, even though the user can subsequently attempt to loosen the tool also with the support of the electric motor, tests show a much lower success rate than with an active reversal of the direction of rotation. This is surprising in particular because during a blockade most of the time the drill bit is not just jammed in the forward direction but also in the reverse direction. It is presumed that the relaxing of the drill bit when reversing the direction of rotation could have a positive effect. The additional value outweighs the apparent disadvantage of a higher stress on the drill when rotating against the standard direction of rotation for which gearwheels and couplings are not designed or for which they can be designed only with additional expense.

The hand-operated rotary power tool, e.g., for a drill bit, has an electric motor for driving a rotary tool, a sensor device for detecting a blockade of the tool; a triggering device, which, in response to a blockade by the sensor device reverses a direction of rotation of the electric motor prior to the blockade for a duration and immediately following induces the electric motor to rotate again in the direction of rotation. Thus, the direction of rotation changes after a blockade for a brief time from a forward direction to a reverse direction and immediately following again to a forward direction. In the process, the motor is not shut off in the meantime, but alternates between braking and accelerating. Changing the direction of rotation may also be repeated multiple times.

One embodiment provides that the duration is 25 ms to 1000 ms.

One embodiment provides for a sensor device to detect a blockade of the drill bit based on a power consumption, e.g., the current consumption, of the electric motor.

One embodiment provides that a rotational acceleration during a blockade is detected and the duration is determined as a function of the detected rotational acceleration of the housing. The lower the rotational acceleration when the drill bit strikes, the more stably a user appears to be able to guide the machine despite the blockade. It is clear that it is advantageous to increase the duration when the user is well able to guide the machine, i.e., the rotational acceleration is low. Otherwise the duration must be reduced.

One embodiment provides that after a first case of a blockade, threshold values for detecting a case of a second blockade are reduced for a second duration. After a blockade has been detected for the first time, as a precaution an immediately following blockade can already be expected when the drill bit is rotating forward. The reaction time is advantageously reduced thereby. The second duration may be two to five times the previously indicated duration.

The following description explains the invention on the basis of exemplary embodiments and figures.

DETAILED DESCRIPTION OF THE DRAWINGS

Figure 1:
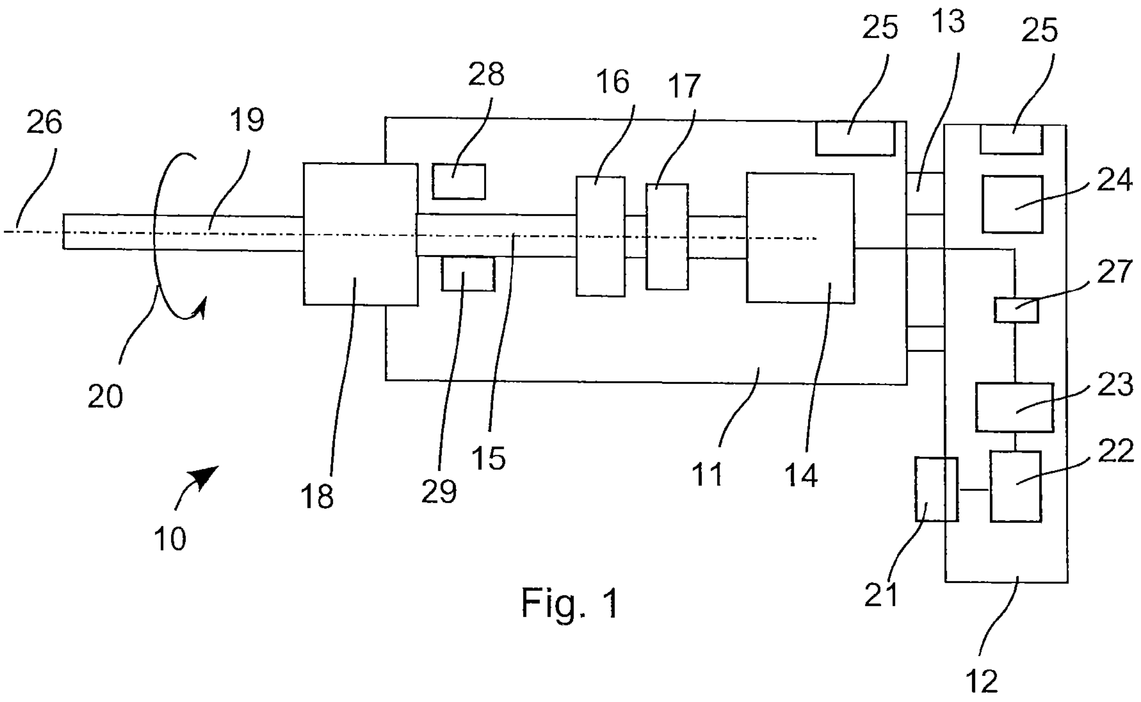
FIG. 1 illustrates a hand-operated drill in accordance with the principles of the present invention.

FIG. 1 shows a hand-operated drill 10. The drill 10 has a machine housing 11 and one or two handles 12 for the user to hold the drill 10. The handle 12 may be applied rigidly to the machine housing 11 or by vibration-damping elements 13 to the machine housing 11.

In the machine housing 11, an electric motor 14 drives a spindle 15. The electric motor 14 is, for example, a mechanically or electronically commutating direct-current motor or an asynchronous alternating-current motor. A gear 16 and/or an overload clutch 17, e.g., a slip clutch, may be connected in a power transmission path between the spindle 15 and the electric motor 14. The spindle 15 transmits its rotational movement by a tool receptacle 18 to a drill bit 19.

In the case of the drill 10, a direction of rotation for the rotational movement of the spindle 15 and thus also for the electric motor 14 is typically predefined and coordinated with the design of the drill bit 19. The direction of rotation for the standard operation is designated as the operating direction 20 or forward in the following. In the case of other hand-held power tools, e.g., a screwdriver, the operating direction 20 may be set by the user.

An actuating button 21 for activating the drill 10 is preferably arranged on the handle 12 or on the machine housing 11. In one embodiment, the actuating button 21 is connected in a circuit between a power source 22, e.g., a battery or a power supply, and the electric motor 14. The drill 10 turns off if the user lets go of the actuating button 21. The actuating button 21 may also include a locking mechanism, which makes sustained operation of the drill 10 possible even without the actuating button 21 being pressed continuously.

The actuating button 21 activates a triggering device 23 for the electric motor 14 as soon as it is pressed. The triggering device 23 controls the direction of rotation of the electric motor 14 and if necessary also the power output of the electric motor 14. Depending upon the type of electric motor 14, the triggering device 23 controls the direction of rotation of the electric motor 14 in different ways. In the case of a mechanically commutating direct-current motor, e.g., universal motor, a current flow direction is adjusted by the windings as a function of the desired direction of rotation. In the case of an asynchronous alternating-current motor or an electrically commutating direct-current motor, the direction of rotation is defined by a time sequence, in which windings of the electric motor 14 are supplied with current.

The drill 10 exerts a reactive torque on the user, which is produced as a reaction to the torque transmitted to the workpiece by the drill bit 19. As long as the workpiece yields during drilling, the reactive torque is low. In the case of a drill bit being blocked, high reactive torque is produced in the workpiece because of the abruptly decelerated rotary components. The user can no longer adequately counteract this reactive torque, which is why the entire drill 10 including the handles 12 begins to rotate round the rotational axis of the drill bit 19. In order to prevent the user from being injured, it is now advantageous to decouple and/or decelerate the handles 12 from all or at least a portion of the rotating components in order to prevent injuries to the user.

Figure 2:
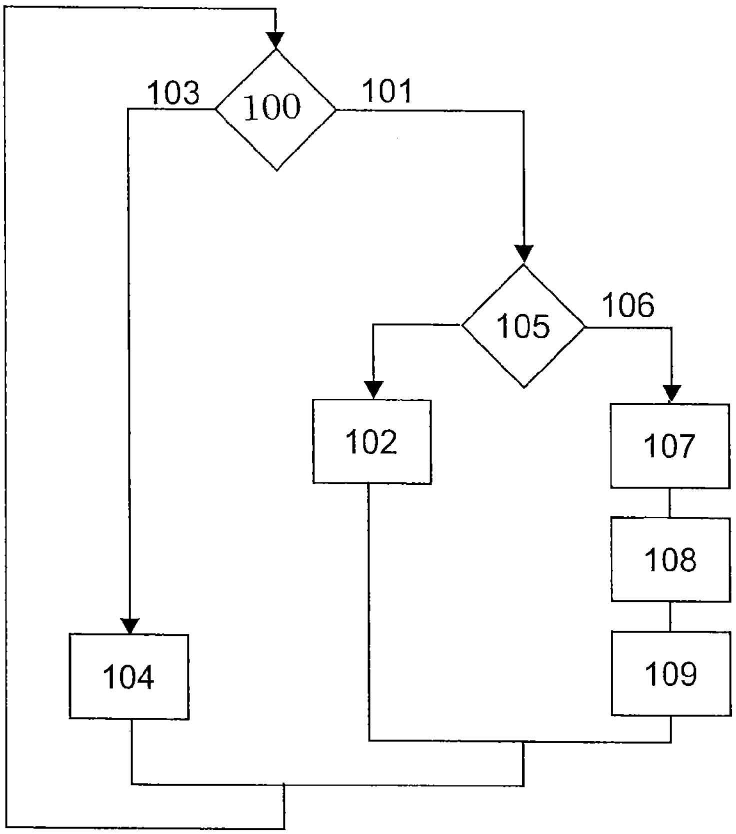
FIG. 2 is a flow chart of a method in accordance with the principles of the present invention.

FIG. 2 illustrates a control method for the drill 10, which takes a blocking of the drill bit 19 into consideration. When the user presses the actuating button 21 (switch-on 100), the triggering device 23 is activated or released (start action 101). In response to control signals from the triggering device 23, the electric motor 14 is connected to the power source 22 and rotates in the operating direction 20 (operating action 102). The spindle 15 and the drill bit 19 inserted into the tool receptacle 18 rotate forward in the operating direction 20. As soon as the user lets go of the actuating button 21 (switch-off 103), the electric motor 14 is disconnected from the power source 22 (stop action 104). In addition, the triggering device 23 may actively decelerate the electric motor 14. The windings may be short circuited for this purpose, for example.

As long as the drill 10 is in operation, i.e., the user is pressing the actuating button 21, a sensor device 24 monitors the operating behavior for a blocking of the drill bit 19 (monitoring action 105). As soon as the sensor device 24 detects a blocking (blockade 106, time point t0), the direction of rotation of the electric motor 14 is reversed. To this end, the electric motor 14 is actively decelerated to a standstill (safety action 107). A first duration T1 until the electric motor 14 has stopped depends on a torque of the electric motor 14 among other things. As soon as the standstill of the electric motor 14 has been reached, it immediately accelerates again backwards, opposite from the previous operating direction 20 (reversal action 108). For a second duration T2 in the range, for example, between 25 ms and 1000 ms, preferably between 25 ms and 200 ms, the electric motor 14 rotates backwards. With respect to the point in time at which the blocking was detected, the electric motor 14 rotates back around an angle. The spindle 15 and the drill bit 19 at least partially follow the reverse rotational movement of the electric motor 14. Because of the inertia and elasticity of the components in the power transmission path, e.g., of the spindle 15, and also of the drill bit 19, they twist during the blocking and relax during the reverse rotation of the electric motor 14. The direction of rotation is then changed again at the second duration T2 and the electric motor 14 rotates forward again (operational start action 109). The sensor device 24 again monitors the operating behavior in case it was deactivated expediently during the reverse rotation.

After a one-time reset of the electric motor 14 around an angle through the safety action 107 and the reversal action 108 and subsequent operational start action 109, the cause of the blockade is frequently not eliminated. The sensor device 24 again detects a blocking (blockade 106, time point t1) and, in this case, again triggers a reset of the electric motor 14, i.e., the safety action 107, reversal action 108 and subsequent operational start action 109. The direction of rotation of the electric motor 14 changes in succession periodically for several cycles. The electric motor 14 remains in constant operation during the several cycles. Simply a sense of rotation of the exerted torque changes from the operating direction 20 to the opposing direction (safety reaction 107, reversal action 108) and again to the operating direction (operational start action 109). The electric motor 14 would only switch off if the user lets go of the actuating button 21 (switch-off 103).

In one embodiment, the sensor device 24 has one or more acceleration sensors 25 on the machine housing 11 or the handle 12, which are preferably arranged offset from a rotational axis 26 of the spindle 15. The acceleration sensors 25 detect a rotational movement of the machine housing 11. The detected acceleration values are processed and compared to a measure, which is characteristic for a blocking. The measure may be based, for example, on the actual acceleration values and a history of the acceleration values. As soon as the measure exceeds a threshold value, the sensor device 24 detects this as a blocking (blockade 105). The detection of renewed blocking within 20 ms to 2000 ms may take place on the basis of other criteria than the detection of the previous blocking. In particular, a lower threshold value may be set.

In another embodiment, the sensor device 24 has one or more current sensors 27, which detect a power consumption of the electric motor 14. The power consumption typically increases rapidly if the drill bit 19 is rotating with difficulty shortly before a blockade. The current sensors 27 may be included, for example, in a motor control for the electrically commutating electric motor. The measure for detecting the blocking may be based on the current values and/or on the acceleration values described above.

The second duration T2 for which the electric motor 14 rotates backwards may be predefined for the drill 10. In one embodiment, a sensor device 28 is provided, which determines a direction of rotation of the tool receptacle 18. After a reverse rotation of the tool receptacle 18, e.g., around an angle of 2 degrees to 5 degrees, is determined, the second duration T2 is ended and the electric motor 14 rotates forwards again. The sensor device 28 may detect the rotation of the tool receptacle 18 by inductive sensors, for example.

A further embodiment determines the torque acting on the spindle 15, i.e., the torque generated by the electric motor 14, during the second duration T2. As soon as the torque falls below a threshold value, the second duration T2 is ended. It is assumed that the electric motor 14 generates lower torque with a dropping load. The load reduces as soon as the drill bit 19 and other to-be-rotated elements 15, 16, 17, 18 are accelerated against their moments of inertia and rotate backwards.

In another embodiment, a sensor device 29 with strain sensors detects a tension of the spindle 15. The second duration T2 ends when the sensor device 29 detects a dropping of a tension below a threshold value. The tension diminishes when the drill bit 19 rotates backwards and no longer accelerates or only accelerates to a low extent.

The method and sensor devices, which initiate an ending of the second duration T2, may be combined in various ways. In addition, the second duration T2 may be limited to a predetermined maximum value of, for example, 10 ms to 25 ms.

The embodiments illustrate examples of the invention. These are not designed to be restrictive, in particular additional actions may be executed between the listed actions, unless explicitly required otherwise. As such, the foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating a hand-operated rotary power tool, comprising the steps of:

detecting a blockade of a rotation of a spindle in a first direction of rotation by an electric motor;

in response to the step of detecting the blockade, rotating the spindle in a second direction of rotation by the electric motor for a time period, wherein the second direction of rotation is opposite from the first direction of rotation; and rotating the spindle in the first direction of rotation after the time period.

2. The method according to claim 1, wherein the time period is 25 ms to 1000 ms.

3. The method according to claim 1, wherein the step of detecting includes a step of detecting a power consumption of the electric motor.

4. The method according to claim 1, wherein the step of detecting includes a step of detecting a rotational acceleration of a housing of the tool.

5. The method according to claim 1, wherein the electric motor remains in constant operation while rotating the spindle in both the first and second directions of rotation.

6. The method according to claim 1, wherein the direction of rotation changes in succession periodically for several cycles while the blockade is detected.

7. A method for operating a hand-operated rotary power tool, comprising the steps of:

detecting a blockade of a rotation of a spindle in a first direction of rotation by an electric motor;

in response to the step of detecting the blockade, rotating the spindle in a second direction of rotation by the electric motor, wherein the second direction of rotation is opposite from the first direction of rotation, wherein the spindle is rotated in the second direction of rotation for a time period; and rotating the spindle in the first direction of rotation after the time period, wherein the step of detecting includes a step of detecting a rotational acceleration of a housing of the tool and wherein the time period is a function of the detected rotational acceleration.

8. The method according to claim 1, further comprising the step of reducing a threshold value for detecting a second blockade.

9. A hand-operated rotary power tool, comprising:

a spindle;

an electric motor coupled to the spindle;

a sensor, wherein the sensor is operable to detect a blockade of a rotation of the spindle in a first direction of rotation by the electric motor; and a triggering device coupled to the electric motor, wherein, in response to a blockade detected by the sensor, the triggering device is operable to rotate the electric motor in a second direction of rotation for a time period and, after the predetermined duration, the triggering device is operable to rotate the electric motor in the first direction of rotation, wherein the second direction of rotation is opposite from the first direction of rotation.

10. The hand-operated rotary power tool according to claim 9, wherein the electric motor remains in constant operation while rotating the spindle in both the first and second directions of rotation.

11. The hand-operated rotary power tool according to claim 9, wherein the direction of rotation changes in succession periodically for several cycles while the blockade is detected.

* * * * *